2,895,943
HYDROGENATING POLYMERIC METHYL ISOPROPENYL KETONE

Donald E. Hudgin and Frank Brown, Summit, N.J., assignors to Celanese Corporation of America, New York, N.Y., a corporation of Delaware No Drawing. Application November 9, 1955
Serial No. 546,000

3 Claims. (Cl. 260—63)

This invention relates to polymers and relates more particularly to stable resinous products produced from polymeric methyl isopropenyl ketone.

It is an object to this invention to provide a novel method for the treatment of polymeric methyl isopropenyl ketone to produce a new resinous material having superior light stability and weather resistance.

Other objects of this invention will be apparent from the following detailed description and claims. In this description and claims all proportions are by weight unless otherwise indicated.

In accordance with one aspect of this invention polymeric methyl isopropenyl ketone is hydrogenated in solution and at a temperature of at most 130° C., preferably not over about 100° C., e.g. in the range of 20 to 100° C. The resulting product is a clear resin which is superior in many respects to the polymeric methyl isopropenyl ketone used as the starting material. Thus, this product has much greater stability to light, better dimensional stability when subjected to changes in humidity, and a higher melting point.

The polymeric methyl isopropenyl ketone used as the starting material may be produced in any desired manner. One preferred starting material is that obtained by the polymerization of the methyl isopropenyl ketone in aqueous emulsion, in the presence of a water-soluble persulfate and under an inert atmosphere, to form an acetone-soluble resin.

The hydrogenation reaction may be effected by means of any of the known hydrogenating agents which are effective at temperatures below 130° C. Thus, metal hydrides such as lithium aluminum hydride have given excellent results. Other metal hydrides suitable for the hydrogenation are those of the formulas:

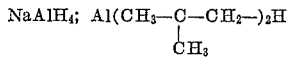

and $Al(C_2H_5)_2H$. Hydrogenation may be carried out under a superatmospheric pressure, e.g. 1000 to 2000 pounds per square inch gauge, of hydrogen in the presence of an active catalyst such as Raney nickel, for example the very active material sold under the name "Raney Nickel Catalyst W-7" by Gilman Paint and Varnish Co., palladium on carbon, or platinum oxide.

The solvent used in the hydrogenation reaction is preferably one which is substantially inert under the reaction conditions, for example, a cyclic ether such as tetrahydrofuran, which is preferred. Other solvents which may be employed are tetrahydropyran and dioxane. For best results the solvent should be capable of dissolving the polymeric methyl isopropenyl ketone but not the desired hydrogenation product, thereby assuring that the product separates from the solution during reaction.

When a metal hydride is employed as the hydrogenating agent it is desirable to use a solvent which dissolves the metal hydride as well as the polymeric methyl isopropenyl ketone. When the hydrogenation is carried out using a Raney nickel type of catalyst, the catalyst is, of course, insoluble in the solvent.

The products of this invention may be employed in many ways. Thus, shaped articles may be produced by injection molding, compression molding or extrusion. Solutions of the products, e.g. in N,N-dimethylformamide, may be spun into filaments useful for the manufacture of textile fabrics or the solutions may be cast into films or used for coating purposes.

The following example is given to illustrate this invention further.

Example 14.25 parts of lithium aluminum hydride ($LiAlH_4$) are added gradually, with stirring, to 145 parts of dry tetrahydrofuran. To the resulting solution there is added, slowly and with stirring, a solution formed by mixing, for 18 hours, 21 parts of polymeric methyl isopropenyl ketone, produced by emulsion polymerization of methyl isopropenyl ketone, and 230 parts of dry tetrahydrofuran. The whole is boiled under reflux at atmospheric pressure for 5 hours, the temperature of the boiling mixture being about 66° C. During this period a slurry is formed due to the separation of a resinous polymer from the solution. The slurry is thinned with 100 parts of tetrahydrofuran and then added gradually and with good agitation to 300 parts of water, after which the resinous polymer is filtered off, washed first with 500 parts of water, then with 500 parts of a 10% aqueous solution of sulfuric acid, and again with water until the polymer is free of sulfuric acid. The washed polymer is then purified by dissolving it in 200 parts of N,N-dimethylformamide, mixing the resulting solution with one part of "Nuchar" (activated charcoal) for ½ hour at room temperature, filtering the solution, adding the filtrate to 500 parts of water to precipitate the polymer and then drying at a temperature of 60° C., first in air for 16 hours and then in a vacuum oven for 6 hours. A comparison of the product of this example with the polymeric methyl isopropenyl ketone used as the starting material is given below.

| | Product of example | Starting material |
|---|---|---|
| Melting point (determined on a Fisher-John's melting point block). | 225° C. | 170° C. |
| Deterioration on exposure to weatherometer. | None after 284 hours' exposure. | Marked deterioration after 132 hours' exposure. |
| Change in dimensions when exposed to changes in relative humidity,[1] from— | | |
| 0% humidity to 90% humidity. | 0 | −0.27%. |
| 0% humidity to 90% humidity and then to 0% humidity. | −0.08% | −0.31%. |
| Solubility in— | | |
| Tetrahydrofuran | Insoluble | Soluble. |
| Acetone | do | Do. |

[1] In each case the products are exposed to each of the specified humidities for 72 hours at 23° C.

It is to be understood that the foregoing detailed description is merely given by way of illustration and that many variations may be made therein without departing from the spirit of our invention.

Having described our invention, what we desire to secure by Letters Patent is:

1. Process for the production of resinous products which comprises hydrogenating polymeric methyl isopropenyl ketone in solution in a cyclic ether which is a solvent for the polymer and a non-solvent for the resulting hydrogenation product, said ether having ether oxygen in a ring of 5 to 6 members and consisting of carbon, hydrogen and oxygen atoms, with a metal hydride soluble in said ether, at a temperature of 20 to 100° C., said hydrogenation product precipitating from said solution during the hydrogenation reaction.

2. Process as set forth in claim 1 in which the solvent is tetrahydrofuran.

3. Process as set forth in claim 2 in which the metal hydride is lithium aluminum hydride.

References Cited in the file of this patent

UNITED STATES PATENTS 2,406,684  Heyd _____ Aug. 27, 1946

FOREIGN PATENTS 478,306  Great Britain _____ Jan. 13, 1938

OTHER REFERENCES

Covert et al.: J. Amer. Chem. Soc., vol. 54, 4115–4117, 1932. (Copy in Scientific Libr.)

Marvel et al.: Journal Am. Chem. Soc., vol. 64, pp. 92–94, January 1942. (Copy in Sci. Libr.)

Krajkeman: Manufacturing Chem., vol. 22, No. 4, pp. 147–152, April 1951. (Copy in Sci. Libr.)